United States Patent [19]

Vachenauer et al.

[11] 4,109,250
[45] Aug. 22, 1978

[54] CIRCUIT FOR THE COMPARATIVE VECTOR MEASUREMENT OF RADIO SIGNAL PULSES WHICH ARRIVE APPROXIMATELY SIMULTANEOUSLY IN A PLURALITY OF RECEIVERS

[75] Inventors: Erwin Vachenauer, Haar; Bernd Mueller, Poecking, both of Germany

[73] Assignee: Siemens Aktiengesellschaft, Berlin & Munich, Germany

[21] Appl. No.: 753,884

[22] Filed: Dec. 23, 1976

[30] Foreign Application Priority Data

Jan. 9, 1976 [DE] Fed. Rep. of Germany ....... 2600687

[51] Int. Cl.² .................................................. G01S 5/06
[52] U.S. Cl. ............................. 343/112 R; 343/106 R
[58] Field of Search ........................ 343/112 R, 106 R

[56] References Cited

U.S. PATENT DOCUMENTS

| 3,305,787 | 2/1967 | Distler et al. ............... 343/106 R X |
| 3,714,573 | 1/1973 | Grossman ................... 343/112 R X |
| 4,047,176 | 9/1977 | Pieverling .................... 343/106 R |

*Primary Examiner*—Maynard R. Wilbur
*Assistant Examiner*—Richard E. Berger
*Attorney, Agent, or Firm*—Hill, Gross, Simpson, Van Santen, Steadman, Chiara & Simpson

[57] ABSTRACT

A circuit for the comparative vector measurement of keyed radio signal pulses, in particular DME pulses which arrive virtually simultaneously in a plurality of receivers and which can exhibit large level differences is utilized where, in each receiver, the pulses are fed to a switching amplifier which has an amplification which is adjustable in discrete stages and the reduction of which is effected automatically with the rise in the leading edge of the relevant signal pulse, and where, when the relevant switching amplifier of the receivers has been traversed, at a specific measuring time which is common to all receivers, the instantaneous amplitudes and instantaneous phases of the measuring signals are measured, the circuit providing that the pulses are fed to the switching amplifier by way of a delay device and, that for the setting of the amplification of the switching amplifier, a control circuit is provided which is directly fed with the radio pulses and which comprises a logarithmic amplifier and a subsequently connected analog-digital converter which is constructed as a comparator chain operating in parallel operation.

10 Claims, 6 Drawing Figures

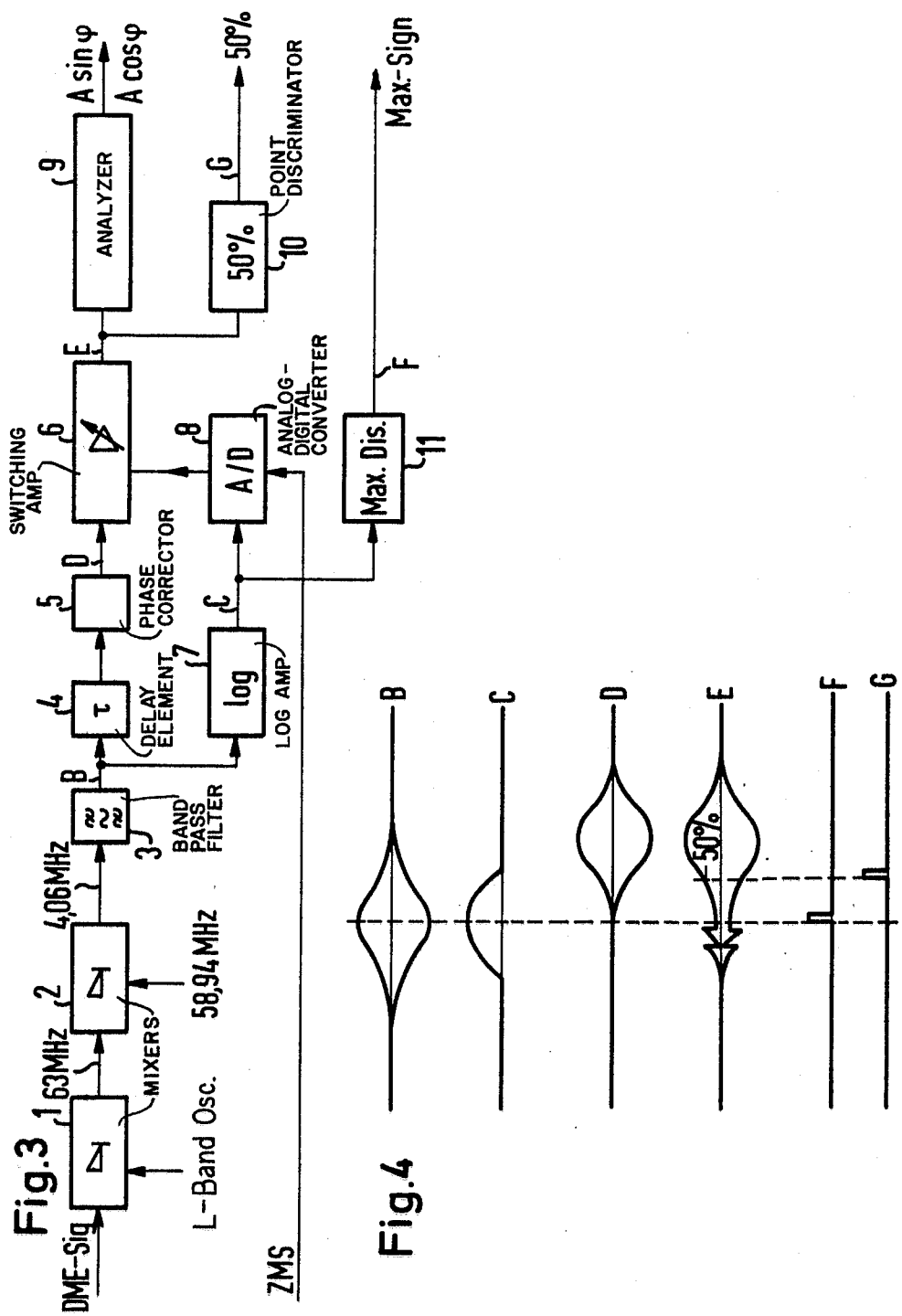

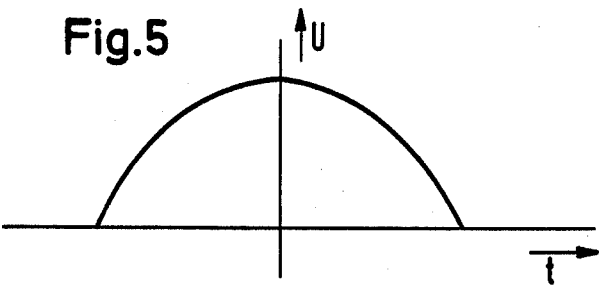
Fig.5
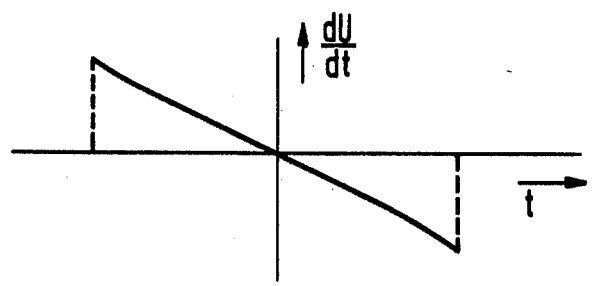
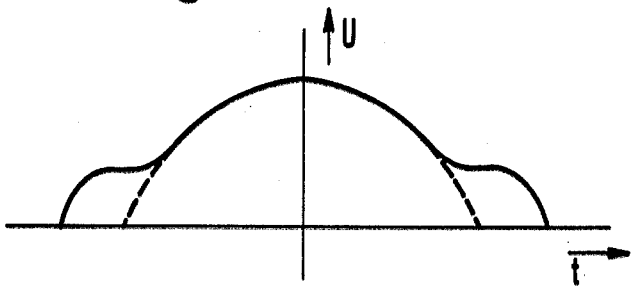
Fig.6
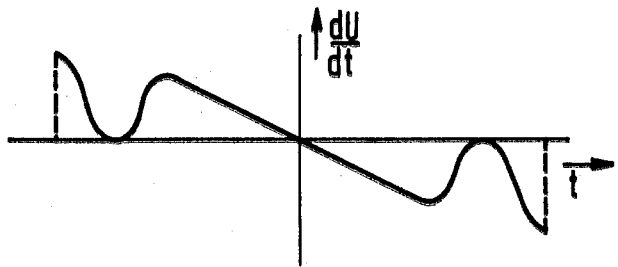

CIRCUIT FOR THE COMPARATIVE VECTOR MEASUREMENT OF RADIO SIGNAL PULSES WHICH ARRIVE APPROXIMATELY SIMULTANEOUSLY IN A PLURALITY OF RECEIVERS

BACKGROUND OF THE INVENTION

1. Field of the Invention

The present invention relates to a circuit for the comparative vector measurement of keyed radio signal pulses, in particular DME pulses, which arrive approximately simultaneously in a plurality of receivers and which can exhibit large differences in level, and more particularly to such a circuit where, in each receiver, the pulses are fed to a switching amplifier which has an adjustable amplification which can be adjusted in discrete steps and the reduction of which is effected automatically with the rise in the leading edge of the relevant signal pulse, and where, having passed through the particular switching amplifier of the receivers, the instantaneous amplitudes and instantaneous phases of the measuring signals are measured at a specific measuring time which is common to all of the receivers.

2. Description of the Prior Art

In locating technology, in particular, the problem occurs in measuring signal pulses which arrive approximately simultaneously in a plurality of receivers and which possess considerably fluctuating signal levels in respect of amplitude and phase so that, in particular on the basis of the mutual phase position of the oscillations in the wave form of a pulse which has been transmitted and received at a plurality of receivers, it is possible to accurately determine the location of orgin of the signal pulse.

In the U.S. patent application Ser. No. 629,284, a process has been proposed by means of which, at a suitable instant, the output information can be measured simultaneously at all the receiver outputs in order to retain the instantaneous phase and amplitude conditions, so that on the basis of the behavior of each individual receiver it is possible to draw conclusions about the wave front which has occurred at the antenna multiple assigned to the receivers. The measuring time circuit basically consists of a retriggerable, monostable trigger stage which is started by the switching pulses from the switching amplifier. When the spacings between these pulses become greater than the stop time of the trigger stage, which is the case in the vicinity of the maximum, the trigger stage switches over and the switching jump which thus occurs is emitted as an individual measuring time.

However, the function of the measuring time circuit described above is dependent upon the pulse shape. For example, the specification of a DME (Distance Measurement Equipment) pulse determines only the width and the gradient between the 10% and the 90% point. With input levels which are greater than −70 dBm, however, the edge portion located before the 10% point is also included in the signal processing, since this then exceeds the noise level. Pulse shapes can occur which, in the aforementioned example, do in fact fulfill the specifications but simulate a maximum at the leading edge. A pulse shape of this type occurs, for example, when in the transmitted component of a DME interrogation device, the requisite keying depth is achieved in that first of all a high frequency signal modulated with a rectangular pulse is produced which then attains its final form in the transmitter end stage by modulation with a bell-shaped pulse (anode modulation). If such a DME pulse reaches a receiver which deals with the vector measurement, a pulse is formed which, on its leading and trailing edges, is provided with a flattening thereof. In the process corresponding to the aforementioned application, the transition into the portion of constant level leads to the triggering of the individual measuring time, as then the intervals between the switching pulses become too large. This results in a blockage of all the other switching steps, which in the case of a further rising pulse leads to the overmodulation of the switching amplifier.

SUMMARY OF THE INVENTION

The primary object of the present invention is to provide a circuit with which at a suitable instant, and independently of the pulse edge rise form, it is possible to obtain a suitable moment for the measurement of the instantaneous value of the relevant amplitude and carrier phase, so that even in the event of pulses which simulate a maximum it is possible to draw conclusions about the wave front which is occurring at the antenna multiple assigned to the receivers.

According to the invention, which relates to a circuit of the type mentioned above, this object is realized in that the pulses are fed to the switching amplifier by way of a delay device, and that for setting of the amplification of the switching amplifier a control circuit is provided which is directly fed with the radio signal pulses and which comprises a logarithmic amplifier and a subsequently connected analog-digital converter which is constructed in the form of a comparator chain which operates in parallel operation.

Thus, the switching stages are already set as soon as the delayed signal pulse reaches the switching amplifier. At the output of the switching amplifier there appears a signal whose undisturbed edge portion is greater than in the process according to the aforementioned application.

Advantageously, the phase and amplitude analysis is carried out at the leading edge of a DME pulse. To this end, a measuring time must be obtained at the leading edge. A time suitable for this purpose is governed by the maximum of the logarithmic signal pulse. An advantageous further development of the circuit in this respect is characterized in that, in each individual receiver, an individual measuring time is determined by means of a maximum discriminator which is connected to the output of the logarithmic amplifier and which differentiates the logarithmic signal pulses and establishes the relevant zero transitions of the differentiated pulses as measuring times, and that after a measuring time which is common to all the receivers and which is derived from the individual measuring times of the receivers by means of integration, a further stepped amplification reduction is blocked in the relevant receiver, and advantageously an individual measuring time is selected in respect of the arrival time sequence and is used as a common measuring time for the simultaneous measurement of the receiving vectors of all the receivers.

In order to prevent the determination of the common measuring time being triggered, as far as possible, by a signal which possesses only a short distance from the noise signal, or only has random characteristics, signals assigned to the individual measuring times are added until an overshooting of a threshold occurs, the threshold being set such that its overshooting requires the individual measuring time signals of a specific sub-number of all the receivers. Not until the threshold is overshot is a common measuring time pulse emitted to all the receivers for purposes of vector measurement and also for the blockage of the switching amplifiers of the receivers.

BRIEF DESCRIPTION OF THE DRAWINGS

Other objects, features and advantages of the invention, its organization, construction and operation will be best understood from the following detailed description taken in conjunction with the accompanying drawings, on which:

FIG. 3 is a schematic diagram of a portion of an individual receiver constructed in accordance with the invention;

FIG. 4 is a pulse plan for various points of the circuit illustrated in FIG. 3; and FIGS. 5 and 6 illustrate two logarithmized DME pulses each with their differential in the case of different input pulse shapes.

DESCRIPTION OF THE PREFERRED EMBODIMENT

Figure 1:
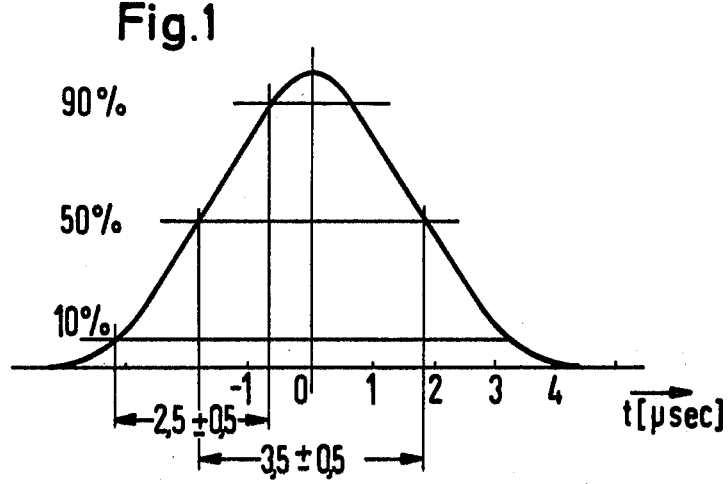
FIG. 1 is a graphic illustration of the time course of a DME pulse.

FIG. 1 illustrates the time course of a conventional DME pulse which corresponds to the specification. However, this specification merely determines the width and the gradient between the 10% and the 90% point. At input levels which are greater than −70 dBm, however, the edge portion which precedes the 10% point is also included in the signal processing, as the latter then exceeds the noise level.

Figure 2:
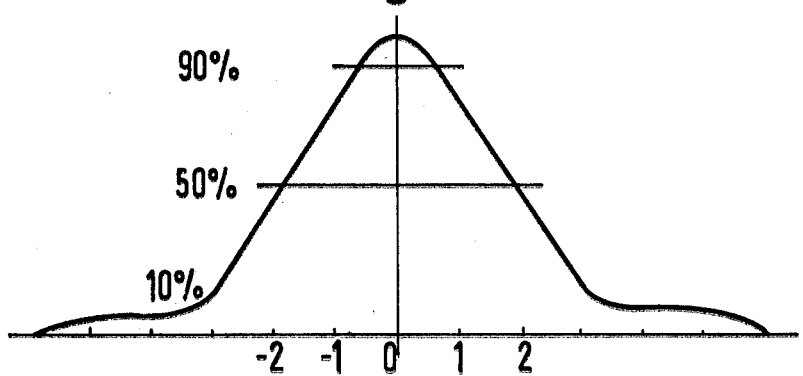
FIG. 2 illustrates the time course of a DME pulse of the type illustrated in FIG. 1, but having a constant edge portion.

It is possible for pulse shapes to occur which, although they fulfill this specification, simulate a maximum at the leading edge. Such a DME pulse is illustrated in FIG. 2. The transition into the portion of constant level in the process described in the aforementioned application leads to the excitation of the measuring time, as the intervals between the switching pulses then become too great. This results in the fact that all the other switching steps of the switching amplifier are blocked, which in the event of a further rising pulse leads to an overmodulation of the switching amplifier.

FIG. 3 is a schematic representation of an individual receiver of a multiple of such receivers for the vectorial analysis of DME pulses. When such pulses are measured in respect of amplitude and phase, it is important that the analysis of the information be effected on the leading edge, as it is at that point that the possibility of disturbance due to the propagation of by-passes is the least. The L-band DME signal is first converted by way of two mixer stages 1 and 2 to a frequency of 63 MHz and then to an intermediate frequency of 4.06 MHz, and then fed to a 4.06 MHz band filter 3. The filter output signal B (also refer to FIG. 4) is fed by way of a delay element 4 and a phase corrector 5 to a switching amplifier 6 which can be set in discrete steps. In parallel, the filter output signal B is fed to a logarithmic amplifier 7 whose output signal C presets the switching amplifer 6 by way of an analog-digital converter 8. The switching stages are already set when the delayed filter output signal D reaches the switching amplifier 6 so that at the output of the switching amplifier 6 a signal E appears which has an edge portion which is undisturbed by switching jumps. The output signal E of the switching amplifier 6 is fed to an analyzer 9 in which, for purposes of vector measurement, still a second measuring signal is produced which is displaced in phase by 90° in relation to the supplied measuring signal, and whose instantaneous amplitude is measured at the same measuring time. Thus, the signals $A \cdot \sin \varphi$ and $A \cdot \cos \varphi$ occur at the output of the analyzer 9, where A is the amplitude and $\varphi$ is the phase angle. The output signal E of the switching amplifier 6 is also fed for purposes of DME analysis to a 50% point discriminator 10 at the output of which a signal G is emitted at the instant at which the 50% point of the signal E is reached.

The circuit illustrated in FIG. 3 can readily be constructed with highly integrated modules. For the logarithmic amplifier 7 it is possible to use an integrated module which can be extended with the aid of three operational amplifiers to form a logarithmic amplifier of 80 dB operational dynamics. The analog-digital converter 8 comprises a series of comparators, the number of which corresponds to the number of switching stages of the switching amplifier 6 and which operate in parallel. Serial analog digital conversion with the aid of a scanning pulse train, using a comparator, is not possible as then there is a dependence upon the edge form. The delay element 4 can be constructed as an all pass filter. The phase corrector 5 is provided in order to eliminate deviations in the use of various specimens of the band filter 3 and of the delay element 4.

As previously explained, the phase and amplitude analysis is to be carried out on the leading edge of the DME pulse. To this end, a measuring time must be derived at the leading edge. A time suitable for this purpose is provided by the maximum of the logarithmic DME pulse C. A maximum discriminator (differentiator) 11 connected to the output of the logarithmic amplifier 7 supplies a signal (maximum signal) F at the time of the DME pulse maximum to a central assembly in which a central maximum signal is formed by integrating the signals of a plurality of channels. The central maximum signal ZMS prevents any further switchover of the amplification of the switching amplifier 6.

In the pulse diagram of FIG. 4, the relevant states at the circuit positions B to G in FIG. 3 are represented one below another. More specifically, the signal B signifies the DME intermediate frequency signal, the signal C signifies the logarithmic DME intermediate frequency signal, the signal D is the delayed DME intermediate frequency signal, the signal E is the DME intermediate frequency signal switched by the switching amplifier 6, the signal F is the maximum signal and the signal G is the signal when the 50% point is reached for the DME analysis.

FIGS. 5 and 6 explain the function of the maximum discriminator 11 in the case of various input pulse shapes. In the maximum discriminator 11 shown in FIG. 3, the logarithmized DME pulse (upper trace in FIG. 5) is differentiated (lower trace of FIG. 5) and the zero transition is determined. The time position of the zero transition of the differentiated pulse is independent of the level of the received signal. The signal functions even with signal forms which have a constant edge portion (upper trace in FIG. 6), i.e. simulate a maximum. The difference between a simulated maximum on the leading edge and the main maximum is that the differential of the leading edge does not pass through zero (lower trace in FIG. 6). As the maximum discriminator is designed in such a manner that it responds only to the zero transition, no signal is emitted at the location of a simulated maximum.

In accordance with an advantageous further development of the invention, the circuit can be used even when in the event of a precision range measurement in accordance with the DME method, a reference point, for example, the 50% point is to be derived at the leading edge of the pulse envelope, for the range measurement. The 50% point of the DME pulse envelope, which is normally used for the range measurement is derived from the output pulse of the switching amplifier and the attenuation element. Because of the provision of the delay element, this pulse possesses a rising edge portion which is largely undisturbed by switching steps, and in this manner facilitates the determination of the 50% point. The article "A New Generation Of DME Devices" by Graziani, published in "Elektrisches Nachrichtenwesen", 47, (1972) No. 2, pp. 115-118 has already disclosed a DME device concept in which a pulse-controlled, automatic amplification regulation is effected. As with the present concept, a delay element and a logarithmic amplifier are used, the logarithmic amplifier presetting the IF amplifier on an analog base (AGC). Then, the 50% point which serves for the range measurement is determined on the undistorted IF amplifier output pulse. The difference between this method and the method described above resides in the following:

The known method operates on an analog basis and only facilitates a range measurement; and The method of the present invention operates on a digital basis and through the amplitude and phase transmission facilitates an angle measurement and at the same time, through the determination of the 50% point, a range measurement.

As these points are measured by way of a plurality of individual receivers of the receiver multiple, as a result of mean value formation it is possible to reduce the static error. The accuracy of the range measurement is dependent upon the time fault error with which the reference point of the leading edge of the DME signal on the base and on the side can be determined.

If a precision DME analysis is used which analysis the 50% point along the side, and only a receiver for the range measurement is used at the base, as a result of the addition of the sub-errors which, for example, amount in each case to ±10 m the overall error obtains a value of ±20 m.

The sub-error which occurs at the base can be reduced by using a plurality of channels of a receiver multiple. The sub-error is inversely proportional to the root of the number of channels in use.

If, for example, 25 channels are used, a reduction factor of 5 is obtained, so that the sub-error on the base caused by statistical disturbances becomes ±2 m. The overall error in the side measurement then amounts to ±12 m.

Although we have described our invention by reference to a particular embodiment thereof, many changes and modifications of the invention may become apparent to those skilled in the art without departing from the spirit and scope thereof. We therefore intend to include within the patent warranted hereon all such changes and modifications as may reasonably and properly be included within the scope of our contribution to the art.

We claim:

1. In a circuit for the comparative vector measurement of keyed radio signal pulses which can exhibit large level differences, in particular DME pulses which arrive virtually simultaneously at a plurality of receivers in a system of the type wherein, in each receiver the pulses are fed to a switching amplifier having an amplification which can be adjusted in steps and the reduction of which is effected automatically with the rise of the leading edge of the relevant signal pulse, and wherein when the relevant switching amplifier has been passed through by a signal pulse and at a specific measuring time for all the receivers the instantaneous amplitudes and instantaneous phases of the measuring signals are measured, the improvement comprising:
    a delay device connected ahead of the switching amplifier for receiving and delaying the signal pulses for a predetermined interval;
    a logarithmic amplifier connected to also receive the undelayed signal pulses; and
    an analog-digital converter connected to said logarithmic amplifier and to the switching amplifier to adjust the amplification thereof prior to receipt of the delayed signal pulses.

2. The improved circuit of claim 1, wherein said analog-digital converter comprises a parallel operating comparator chain.

3. The improved circuit of claim 1, and further comprising:
    a maximum discriminator connected to the output of said logarithmic amplifier for differentiating the logarithmatized signal pulses to establish the relevant zero crossings thereof as individual measuring times.

4. The improved circuit of claim 3, and further comprising:
    adding means connected to said maximum discriminators of all of the receivers for adding signals assigned to the individual measuring times until a predetermined threshold is attained,
    said threshold selected to be such that overshooting thereof requires the individual measuring times of a specific sub-number of all of the receivers,
    said adding means connected to said analog-digital converters for blocking and switching amplifiers.

5. The improved circuit of claim 2, wherein:
    said switching amplifier comprises a number of adjustable steps; and
    said comparator chain comprises the same number of chain elements.

6. The improved circuit of claim 1, wherein:
    said delay device comprises an all pass filter.

7. The improved circuit of claim 1, and further comprising:
    a phase corrector connected between said delay device and the switching amplifier.

8. The improved circuit of claim 1, for simultaneous use in precision range measurements, in accordance with the DME process, and comprising:
    a measuring discriminator connected to the output of the switching amplifier and operable to provide a reference point signal at a predetermined percentage of the maximum of the signal envelope.

9. The improved circuit of claim 1, for simultaneous use in precision range measurements in accordance with the DME process, and comprising:
    a measuring discriminator connected to the output of the switching amplifier and operable to provide a reference point signal at 50% of the maximum of the signal envelope.

10. The improved circuit of claim 9, and further comprising:
    means connected to said measuring discriminators of a plurality of the receivers to provide a mean value formation of the individual reference points.

* * * * *